Aug. 14, 1956        L. THERIAULT        2,758,411
SINKER GUARD
Filed June 4, 1954
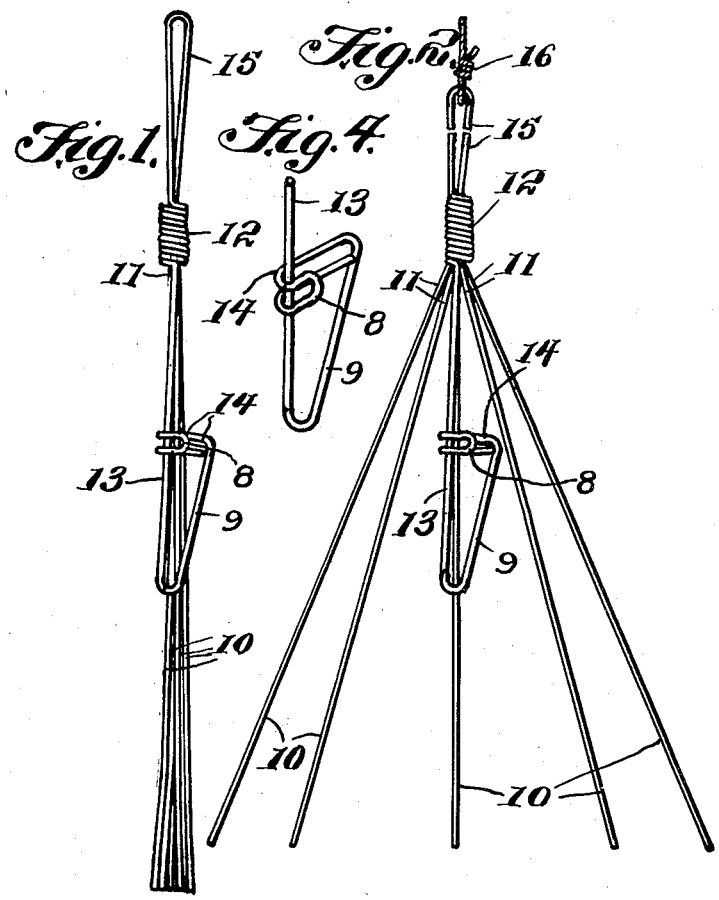
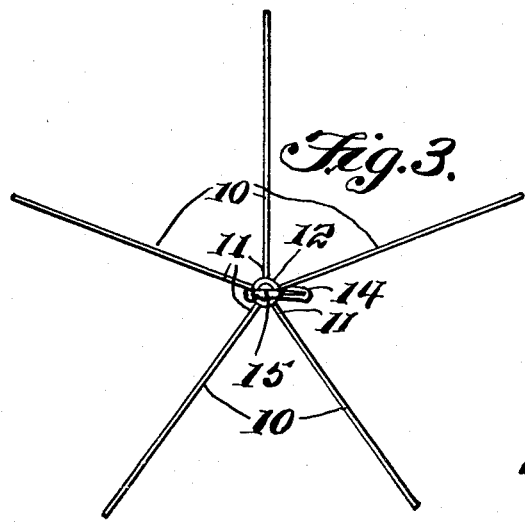
INVENTOR.
Leonard Theriault,
BY
McMorrow, Berman & Davidson
ATTORNEYS

2,758,411
SINKER GUARD
Leonard Theriault, Salmon, Idaho

Application June 4, 1954, Serial No. 434,370

2 Claims. (Cl. 43—44.97)

The present invention relates to fishing tackle and specifically applies to a guard to keep sinkers and weights from being caught in crevices in rocks and on sunken logs.

In most stream fishing and other places where the water is running, it is necessary to attach a sinker of relatively large dimensions when compared to the hook and one of considerable weight also, in order that the lure or hook with its bait be kept near the bottom of the stream or pond, where fish are generally congregated especially in hot weather. The weights used are commonly known as sinkers and are prone, because of their weight and bulk, to get caught between branches or logs, or caught in crevices in rocks in the bed of the stream.

To free such sinkers from their entanglements is often difficult and much tackle is lost and many lines unnecessarily severed. The present device is intended to obviate many of those losses and to enable the sinker to be used in places of logs and rocks, where heretofore those places are avoided by wise and cautious anglers.

The present invention has, therefore, for its principal object the provision of a guard for a sinker that will keep it free from entanglements with underwater obstructions.

Another object of the present invention is to provide a sinker guard which may be folded and when unfolded for use springs into its most effective shape.

A further object of the present invention is to provide a sinker guard of resilient wire or plastic which may be used to keep the sinker free from being caught in rock crevices and the like.

A still further object of the present invention is to provide a sinker guard having outspread relatively stiff wires or strands which ward off entanglements with submerged articles, and one having a simple construction with easily available materials.

These and other objects and advantages of the present invention will be fully apparent upon consideration of the following description when taken in connection with the annexed drawings in which:

Figure 1 is a plan view in elevation of one embodiment of the invention, showing it in folded, transportable condition.

Figure 2 is a view of the invention ready for action before the attachment of a sinker, this being another view of the same embodiment of Figure 1.

Figure 3 is a top plan view of the invention of Figure 1 and Figure 2.

Figure 4 is a detailed view of the clasp section of the embodiments shown in Figures 1 and 2.

Referring in greater detail to the drawings, in which like numerals indicate like parts throughout the several views, in Figures 1 and 2, the invention will be seen to consist of a plurality of spring or resilient strands 10, Figure 2, arranged in diverging relation and having the convergent ends 11 in abutting relation, one of the strands, indicated by the numeral 13, having the portion adjacent the convergent end wound in a tight spiral 12 about the convergent abutting ends of the resilient strands 10 to connect or hold the convergent ends together. The resilient strands 10 are bendable from the diverging position to a side by side nested position.

The strand 13 also has a portion adjacent its divergent end bent back upon itself so as to form a loop 9 which extends along this strand in the direction of the spiral 12 to a point spaced from the spiral with the main arm 14 which extends transversely from the terminating point of the loop 9 to and about this trand 13 and an auxiliary arm 8 which extends transversely from the strand 13 along and in spaced relation with respect to the main arm 14 to a point adjacent to and spaced from the strand 13, the auxiliary arm 8 and the loop 9 and the main arm 14 embracingly engaging the intermediate portions of the resilient strands 10 when the latter are in side by side nested position, Figure 1, for holding the resilient strands in side by side nested position. Another loop 15 adjacent the convergent abutting ends 11 of the strands 10, Figures 1 and 2, is connected thereto for attaching a line thereto. Specifically, the strand 13 has a convergent end portion bent back upon itself to form a closed loop 15 for attachment of a line thereto.

What is claimed is:

1. A fishing sinker guard comprising a plurality of resilient strands arranged in diverging relation and having their convergent ends in abuting relation, one of said strands having a portion adjacent the convergent end wound in a tight spiral about said convergent ends of said resilient strands connecting said convergent ends together, said resilient strands being bendable from the diverging position to a side by side nested position, the portion of said one strand adjacent the divergent end being bent back upon itself so as to form a loop extending along said one strand in the direction of said spiral to a point spaced from said spiral and having a main arm extending transversely from the terminating point of said loop to and about said one strand, and an auxiliary arm extending transversely from said one strand along and in spaced relation with respect to said main arm to a point adjacent to and spaced from said one strand, said auxiliary arm and said loop and main arm embracingly engaging the intermediate portions of said resilient strands when the latter are in the side by side nested position for holding said resilient strands in the side by side nested position, and a second loop adjacent said converged ends of said resilient strands connected thereto for attaching to a line.

2. A fishing sinker guard comprising a plurality of resilient strands arranged in diverging relation and having convergent ends in abutting relation, one of said strands having a portion adjacent the convergent end wound in a tight spiral about said convergent ends of said resilient strands connecting said convergent ends together, said resilient strands being bendable from the diverging position to a side by side nested position, the portion of said one strand adjacent the divergent end being bent back upon itself so as to form a loop extending along said one strand in the direction of said spiral to a point spaced from said spiral and having a main arm extending transversely from the terminating point of said loop to and about said one strand, and an auxiliary arm extending transversely from said one strand along and in spaced relation with respect to said main arm to a point adjacent to and spaced from said one strand, said auxiliary arm and said loop and main arm embracingly engaging the intermediate portions of said resilient strands when the latter are in the side by side nested position for holding said resilient strands in the side by side nested position, said one strand having the convergent end portion bent back upon itself to form a closed second loop adjacent the said converged connected ends of said resilient strands for attaching to a line.

References Cited in the file of this patent

UNITED STATES PATENTS

| | | |
|---|---|---|
| 798,575 | Eastman | Aug. 29, 1905 |
| 824,739 | Phelps | July 3, 1906 |
| 973,119 | Lisch | Oct. 18, 1910 |
| 1,768,033 | Deatz | June 24, 1930 |
| 2,074,258 | Fravel | Mar. 16, 1937 |
| 2,683,324 | Engleman | July 13, 1954 |

FOREIGN PATENTS

| | | |
|---|---|---|
| 481,460 | Canada | Mar. 4, 1952 |